United States Patent
Galea (10) Patent No.: US 9,908,284 B2
(45) Date of Patent: Mar. 6, 2018

(54) STRETCH FILM AND METHOD OF FABRICATION THEREFOR

(76) Inventor: Anthony Galea, Markham (CA)

( * ) Notice: Subject to any disclaimer, the term of this patent is extended or adjusted under 35 U.S.C. 154(b) by 684 days.

(21) Appl. No.: 12/622,917

(22) Filed: Nov. 20, 2009

(65) Prior Publication Data

US 2011/0121119 A1    May 26, 2011

(51) Int. Cl.
| | | |
|---|---|---|
| *B65H 18/08* | (2006.01) | |
| *B65H 23/00* | (2006.01) | |
| *B65H 18/28* | (2006.01) | |
| *B29C 55/18* | (2006.01) | |
| *B29C 55/06* | (2006.01) | |
| *B65H 20/02* | (2006.01) | |
| *B65H 18/16* | (2006.01) | |
| *B65B 11/00* | (2006.01) | |

(52) U.S. Cl.
CPC .............. *B29C 55/18* (2013.01); *B29C 55/06* (2013.01); *B65H 18/16* (2013.01); *B65H 20/02* (2013.01); *B65B 2011/002* (2013.01); *B65H 2301/5122* (2013.01); *B65H 2404/13161* (2013.01); *B65H 2404/143* (2013.01); *B65H 2701/1752* (2013.01)

(58) Field of Classification Search
CPC ........ B65H 18/28; B65H 20/02; B65H 18/16; B29C 55/18; B29C 55/023; B29C 2023/0616; B29C 55/06; B32B 25/08; B32B 5/142; B32B 27/08; B32B 27/302; B32B 27/327; B32B 27/40; B32B 3/28; B32B 3/30; B32B 2555/02; B32B 2250/03; B32B 2250/24; B32B 2250/40; B32B 2307/51
USPC ........ 242/160, 160.4; 33/555.1, 555.2, 555.3
See application file for complete search history.

(56) References Cited

U.S. PATENT DOCUMENTS

| 5,531,393 | A | * | 7/1996 | Salzsauler et al. ........ 242/160.4 |
| 5,967,437 | A | | 10/1999 | Martin-Cocher et al. |
| 6,472,084 | B1 | * | 10/2002 | Middlesworth et al. ..... 428/517 |
| 6,592,699 | B1 | | 7/2003 | Mehta et al. |

* cited by examiner

*Primary Examiner* — William A. Rivera (57) ABSTRACT

A method for producing a roll of stretch film comprises the steps of passing a stretch film web over a first roller, and winding the stretch film web around a second roller against the first roller, where the first roller has a surface for enabling the introduction of air into the wound stretch film web.

29 Claims, 7 Drawing Sheets

STRETCH FILM AND METHOD OF FABRICATION THEREFOR

FIELD OF THE INVENTION

The present invention relates generally to packaging and in particular, to a stretch film and a method of fabrication therefor.

BACKGROUND OF THE INVENTION

Stretch film is widely used in the wrapping and securing of pallet loads for shipping. It is known that such plastic films, which are commonly made from low density polyethylene (LLDPE), gain significantly in ultimate tensile strength when stretched above their yield point. This is due to the fact that such plastic films have a "memory". For example, film that is stretched to such a degree so as to create a 10% memory will shrink 10% of its stretched length. This "memory" assists in the holding of pallet loads wrapped with stretch film, as the "memory" or the tendency to shrink assists in securing the palletized articles together under compression.

Figure 1:
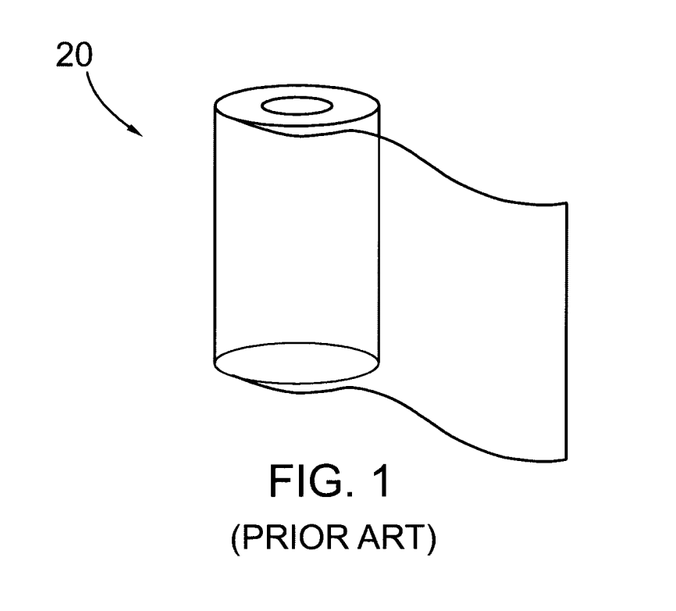
FIG. 1 is a perspective view of a prior art roll of stretch film.

Stretch film is commonly fabricated by stretching the web of plastic film prior to rolling. This pre-stretching facilitates the process of manually applying of the product to a pallet load, as the end user is required to apply less manual tensile force during the wrapping process. Such pre-stretched rolled stretch film webs are fabricated in the form of rolls 20, as illustrated in FIG. 1, and provide a compact product that may be either applied to a pallet load manually or loaded into an automated wrapping machine.

A number of methods of fabricating pre-stretched stretch film have previously been disclosed. For example, U.S. Pat. No. 5,967,437 to Martin-Cocher, et al. discloses a method of manufacturing rolls of pre-stretched film that comprises importing oscillation to the film with a component perpendicular to the film axis. For example, during pre-stretching and winding of the film on a take-up roll, a feed roll, i.e. a spool from which the stretchable film for stretching is taken, is caused to oscillate, and/or the take-up core is caused to oscillate. This ensures that successive layers of film are offset, in particular at the margins of the film. Rolls of film obtained in this way do not have portions of extra thickness and lower tension at the margins.

U.S. Pat. No. 6,592,699 to Mehta, et al. discloses a highly stretched film that has permanently heat-sealed edges which are nearly invisible. A folding apparatus folds the edge portions of a film to form folded edges. The folded film then is passed through a bridle mechanism having two heated rolls. A series of nips apply pressure to the folded film as it is heated by the heated rolls. The nip pressure, combined with the heat imparted by the heated rolls, causes thermal welding of the folded edges resulting in permanent heat-sealed edges. Because the film edges are folded prior to the hot-stretching, the hot stretch process performs dual functions of stretching the film and heat sealing the folded edges. The resulting stretched film has permanently heat-sealed edges that do no separate, and which prevent tearing of the film edges during subsequent processing and use.

Stretch film has a tendency to retain a "memory" after rolling, which tends to cause the stretch film to contract into its original length as the film recovers, and which in turn can cause adjacent layers of rolled, pre-stretched film tend to fuse together. This can make it difficult to unroll pre-stretched film without tearing the film. Additionally, rolls of stretch film made by conventional fabrication methods are tightly wound, and are dense, solid items. Such stretch film rolls are typically not tolerant to mishandling such as accidental dropping, and can suffer damage such as denting. Denting can cause the film to tear during use (i.e. during the wrapping of a pallet load) which effectively terminates the usage lifetime of the roll and results in waste.

It is an object of this invention to provide an improved roll of stretch film that has a high tolerance to mishandling, and a method of fabricating the same.

SUMMARY OF THE INVENTION

Accordingly, in one aspect there is provided an apparatus for rolling a stretch film web comprising:

a first roller having a surface engaging the stretch film web, the surface being shaped to cause the web to wrinkle as it passes over the surface;

a second roller for winding the wrinkled stretch film so as to trap air in the rolled film; and an assembly for rotatably driving the second roller.

In still another aspect, there is provided a method for producing a roll of stretch film comprising the steps of:

passing a stretch film web over a first roller, the roller having a surface shaped to wrinkle the stretch film web; and winding the stretch film web in a wrinkled state around a second roller so as to trap air within the rolled film.

In yet another aspect, there is provided an apparatus for rolling a stretch film web comprising:

a surface engaging a stretch film web, the surface being shaped to cause the web to wrinkle as it passes over the surface;

a roller for winding the wrinkled stretch film so as to trap air in the rolled film; and an assembly for rotatably driving the roller.

In still another aspect, there is provided a method for producing a roll of stretch film comprising the steps of:

passing a stretch film web over a surface shaped to wrinkle the stretch film web; and winding the stretch film web in a wrinkled state around a roller so as to trap air within the rolled film.

In yet another aspect, there is provided a roll of stretch film, the stretch film being rolled in a deliberately wrinkled state so as to trap air within the roll.

In still another aspect, there is provided a roll of stretch film, the stretch film being wound against a surface shaped for enabling the introduction of air into the roll of film.

In another aspect, there is provided an apparatus for rolling a stretch film web comprising:

a first roller having a surface engaging the stretch film web;

a second roller for winding the stretch film against the first roller, the surface of the first roller being shaped for enabling the introduction of air into the wound stretch film web; and an assembly for rotatably driving the second roller.

In still another aspect, there is provided a method for producing a roll of stretch film comprising the steps of:

passing a stretch film web over a first roller; and winding the stretch film web around a second roller against the first roller, the first roller having a surface for enabling the introduction of air into the wound stretch film web.

In yet another aspect, there is provided an apparatus for rolling a stretch film web comprising:

a surface engaging a stretch film web;

a roller for winding the stretch film web against the surface, the surface being shaped for enabling the introduction of air into the wound stretch film web; and an assembly for rotatably driving the roller.

In still another aspect, there is provided a method for producing a roll of stretch film comprising the steps of:
  passing a stretch film web over a surface; and
  winding the stretch film web around a roller against the surface, the surface being shaped for enabling the introduction of air into the wound stretch film web.

BRIEF DESCRIPTION OF THE DRAWINGS

Embodiments will now be described more fully with reference to the accompanying drawings in which.

DETAILED DESCRIPTION OF THE EMBODIMENTS

Figure 2:
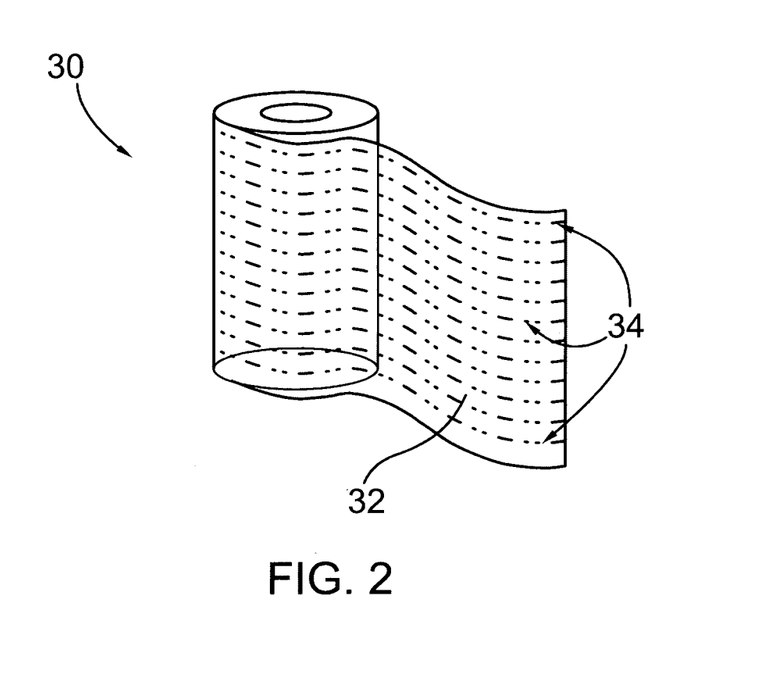
FIG. 2 is a perspective view of a roll of stretch film.

Turning now to FIG. 2, a roll of stretch film is shown, and is generally indicated by reference numeral 30. Roll 30 comprises a rolled stretch film web 32 that has been oriented prior to rolling, and which also has wrinkles 34 that have been deliberately formed in the stretch film web 32 prior to rolling. As will be appreciated, wrinkles 34 allow air to be trapped within the roll 30, such that the roll 30 is softer, spongier and less dense than would otherwise be obtained by rolling the stretch film web 32 without wrinkles. Wrinkles 34 therefore enable the roll 30 to be more resilient to handling errors such as, for example, the dropping of roll 30 during the manual wrapping of pallet loads, or during the manual loading of roll 30 into an automated wrapping machine. In the embodiment shown, wrinkles 34 are oriented generally longitudinally with respect to the stretch film web 32, and are distributed generally evenly across the width of the stretch film web 32. However, as will be appreciated, wrinkles 34 need not be limited to this orientation or this distribution in order for air to be trapped within roll 30.

Figure 3:
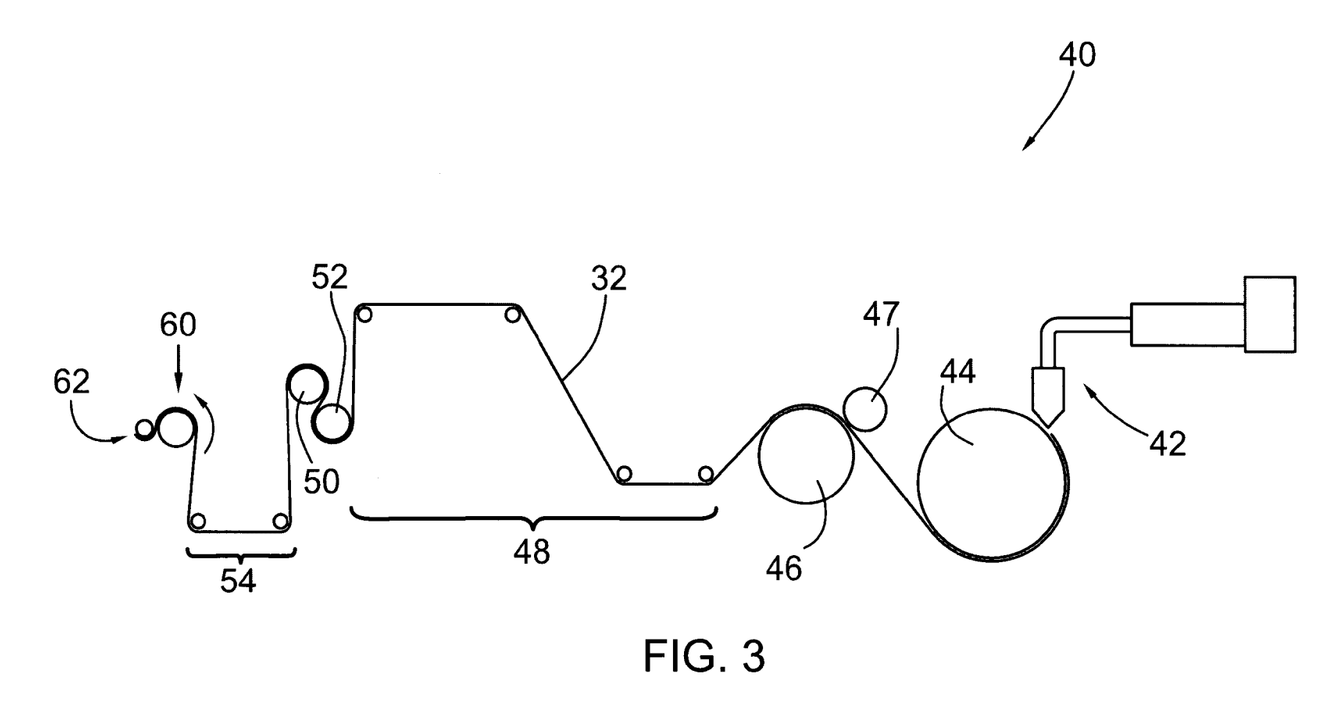
FIG. 3 is a side view of an apparatus for the production of the roll of stretch film of FIG. 2.
Figure 4:
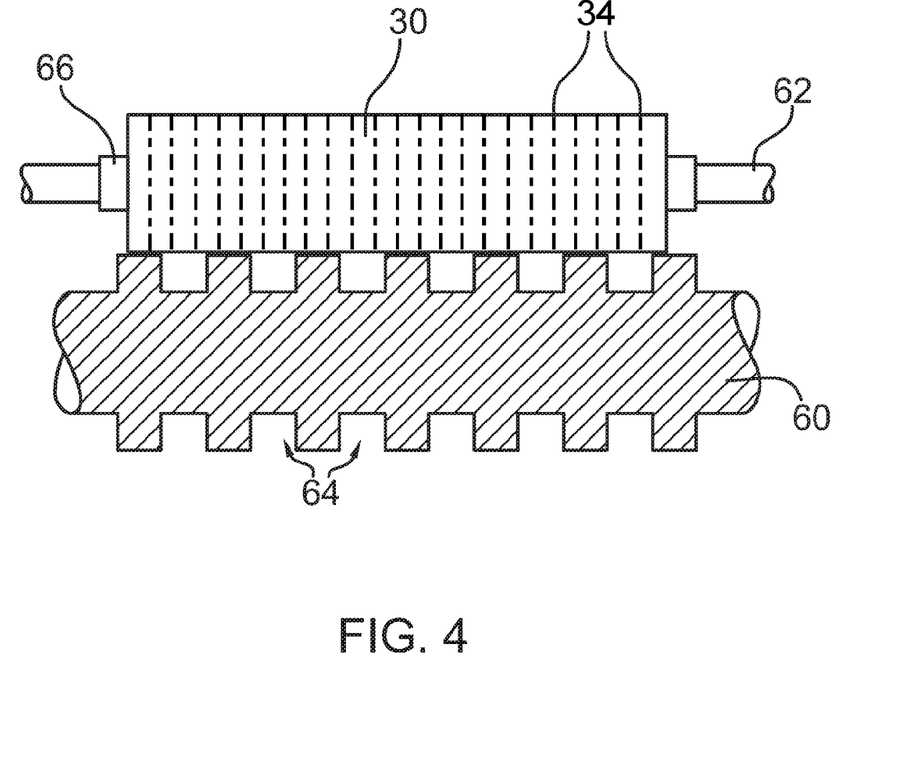
FIG. 4 is a plan view of a set of rollers for use with the apparatus of FIG. 3.
Figure 5:
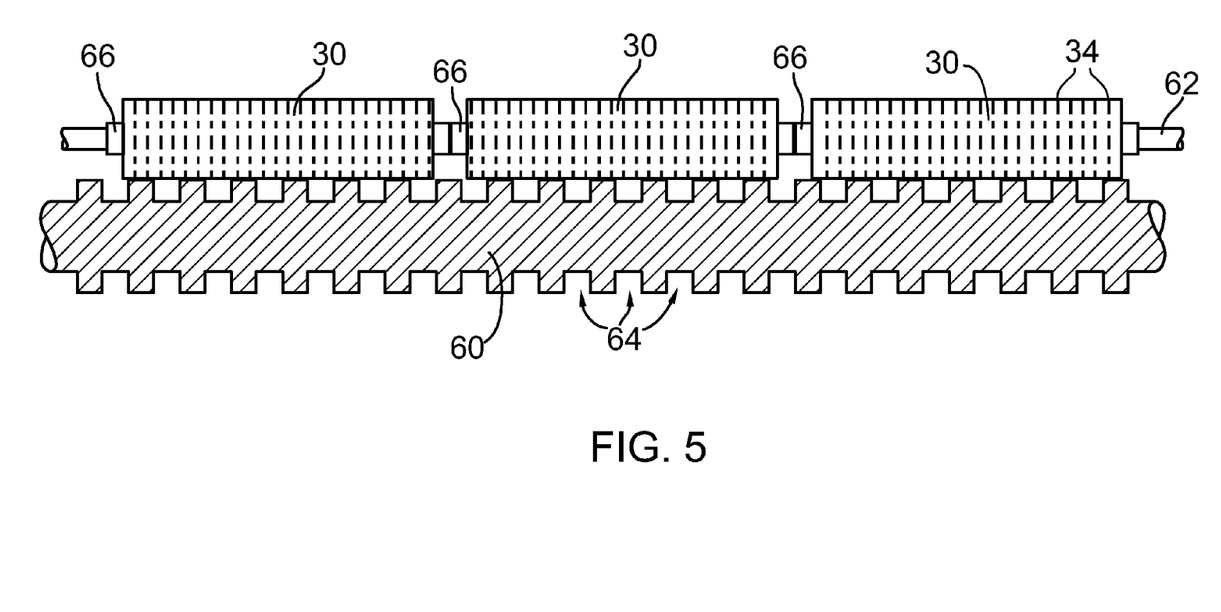
FIG. 5 is another plan view of the set of rollers of FIG. 4, showing an arrangement used for fabricating a plurality of rolls.

FIGS. 3 to 5 illustrate a production apparatus used for fabricating roll 30, generally indicated using reference numeral 40. Production apparatus 40 comprises an extruder 42 that dispenses a continuous sheet of plastic film onto a surface of a rotating first drum 44 so as to form a stretch film web 32, as is known in the art. Stretch film web 32 is fed from first drum 44 to pass between second drum 46 and second drum counter-roller 47, and is then fed through a first series 48 of guiding rollers. A third drum 50 and a third drum counter-roller 52 are positioned downstream from the series 48 of guiding rollers. The stretch film web 32 is stretched or "oriented" as it passes through this portion of the production apparatus 40. This stretching or orienting is accomplished by controlling the rotation speeds (i.e. rpm) of second drum 44 and third drum 50, and such that the speed of the surface of third drum 50 is greater than that of second drum 44. By controlling this difference of speeds, the stretching or orienting may be controlled over a range of from 5% to 30%. As is known in the art, the stretch film web generally moves through production apparatus 40 at speeds ranging from 1500 ft/min to 3000 ft/min.

Downstream from third drum 50 is positioned a second series 54 of guiding rollers, followed by a grooved roller 60 and a take-up roller 62 rotating in opposite directions. In this embodiment, and as may be more clearly seen in FIG. 4, grooved roller 60 comprises a surface having a plurality of radial grooves 64. Grooved roller 60 is positioned adjacent to a take-up roller 62, which provides a surface onto which a core 66 is removably mounted. As stretch film web 32 passes over grooved roller 60, grooves 64 cause stretch film web 32 to become wrinkled evenly across its width. Stretch film web 32 is then wound in this wrinkled state around take-up roller 62, and in particular around core 66 removably mounted onto take-up roller 62, so as to form roll 30 having air trapped within. In this sense, stretch film web 32 is wound around take-up roller 62 "against" grooved roller 60. An assembly is provided for rotatably driving take-up roller 62. An assembly may optionally be provided for driving grooved roller 60.

As is known in the art, to increase the efficiency of the production process, a plurality of rolls 30 may be fabricated simultaneously in a side-by-side arrangement using a single roller 60 and a single roller 62. Such an arrangement is depicted in FIG. 5b. Here, a plurality of adjacently-spaced stretch film webs 32 is fed into rollers 60 and 62, wherein each stretch film web 32 is wound around a respective core 66 removably mounted onto take-up roller 62.

Figure 6:
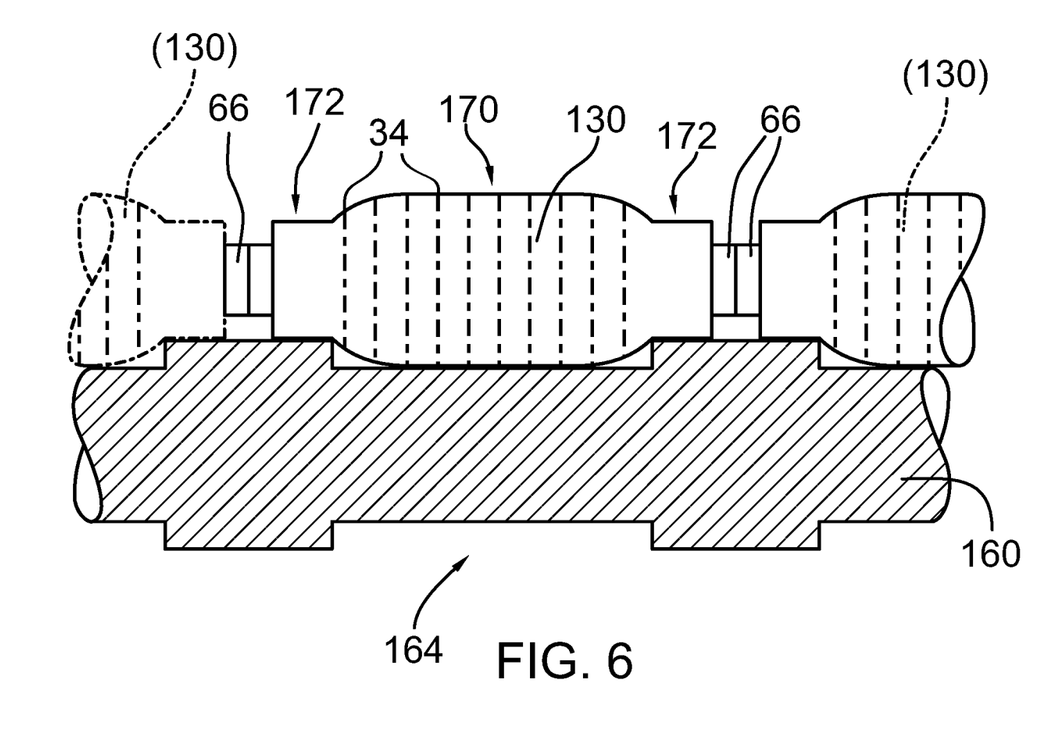
FIG. 6 is a cross-sectional view of another embodiment of a set of rollers for use with the apparatus of FIG. 3.
Figure 7:
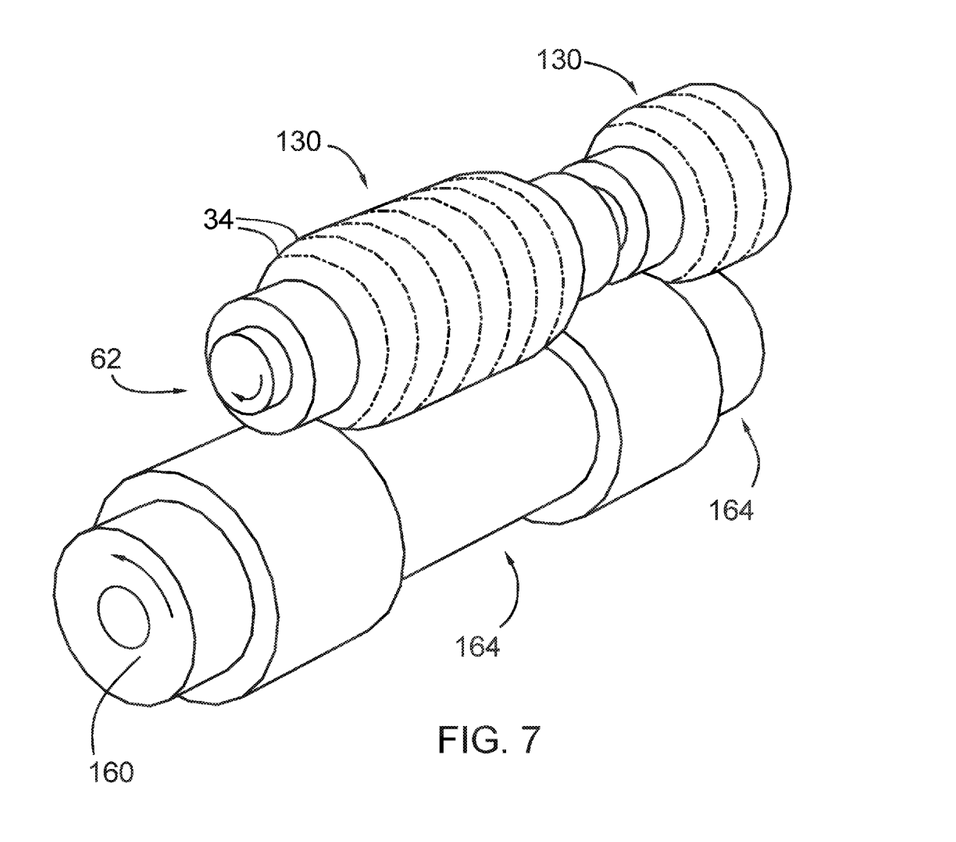
FIG. 7 is a perspective view of the set of rollers of FIG. 6.
Figure 8:
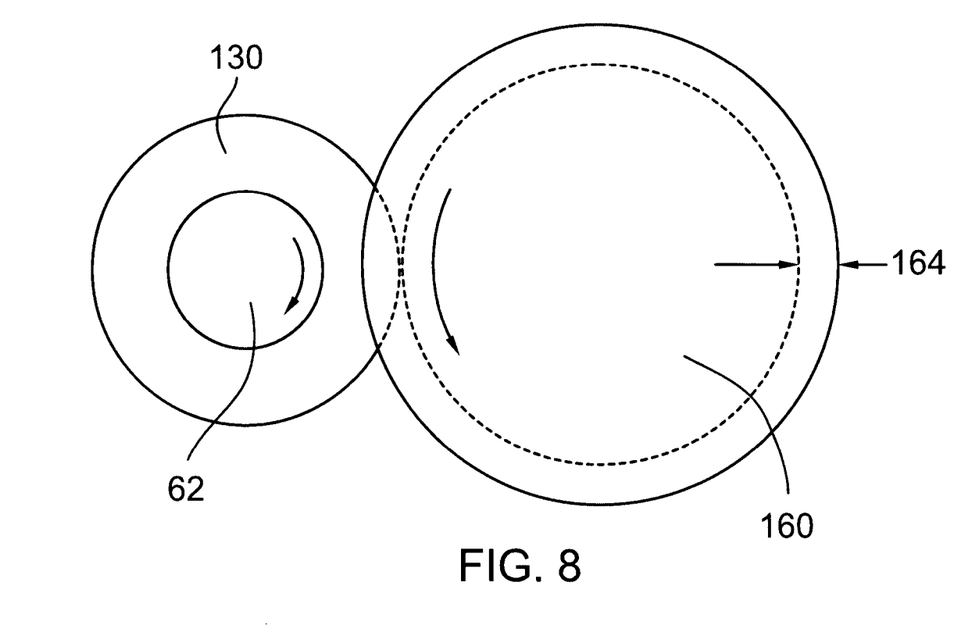
FIG. 8 is a side elevation view of the set of rollers FIG. 6.

FIGS. 6 to 8 illustrate another embodiment of a pair of rollers 160 and 62 for use with the production apparatus 40. Roller 160 comprises an array of single radial grooves 164. Each groove 164 causes wrinkling across the width of a respective stretch film web 32 as it passes around roller 160. Stretch film web 32 is then wound in this wrinkled state around roller 62, and in particular around core 66 removably mounted onto roller 62, so as to form roll 130. Owing to the size of the groove 164 relative to the width of the roll 130, roll 130 has a non-uniform profile across its width, wherein the diameter in a central portion 170 of roll 130 is greater than in each end portion 172. This difference is attributed to a difference in the degree of wrinkling, and therefore in the quantity of trapped air, between central portion 170 and end portions 172.

Although in embodiments described above, the cross sectional profiles of the grooves are illustrated as comprising right angles, the profiles of the grooves are not limited to this configuration, and may comprise grooves having profiles of any shape. Indeed, one skilled in the art will appreciate that varying the shape of the groove profile will have an effect on the wrinkling. Similarly, one skilled in the art will also appreciate that the varying any of the spacing and the depth of the grooves will have an effect on the wrinkling.

In embodiments described above, the production apparatus comprises a grooved roller that causes the stretch film web to be wrinkled as it passes over the roller. However, in other embodiments, the production apparatus may comprise a device other than a roller for causing wrinkling. For example, such a device may comprise a guide or channel having a surface shaped to cause wrinkling of the stretch film web as the web passes through the device or over the surface of the device. In this embodiment, the stretch film web would be wound in this wrinkled state around the take-up roller "against" the surface of the device.

The roll of stretch film that has been rolled in a wrinkled state so as to trap air within the roll may be formed using any apparatus and/or method of the embodiments described above. Alternatively, in other embodiments, the roll of stretch film that has been rolled in a wrinkled state so as to trap air within the roll may instead be formed by unwinding a conventional roll of stretch film wound in an unwrinkled state, and rewinding the film in such a manner as to roll the film in a wrinkled state and so as to trap air within the roll.

Although in embodiments described above, the grooved roller has one or more radial grooves, the orientation of the grooves are not limited to the radial orientation, and instead the grooved roller may comprise grooves that are oriented at an angle to the radial orientation.

Although embodiments have been described above with reference to the accompanying drawings, those of skill in the art will appreciate that variations and modifications may be made without departing from the spirit and scope thereof as defined by the appended claims.

What is claimed is:

1. An apparatus for rolling a stretch film web comprising:
   a plurality of drums for stretching the stretch film web, the drums being configured to rotate with different surface speeds to stretch the web;
   a first roller positioned downstream from the plurality of drums, the first roller having a grooved surface for engaging the stretch film web, the grooved surface comprising a plurality of grooves with each groove being configured to form a respective plurality of continuous wrinkles in the stretch film web between edges of the groove, the wrinkles being oriented generally longitudinally with respect to the stretch film web;
   a second roller for winding the wrinkled stretch film so as to trap air in the rolled film; and
   an assembly for rotatably driving the second roller.

2. An apparatus according to claim 1, wherein the wrinkles are distributed generally evenly across the width of the stretch film web.

3. An apparatus according to claim 1, wherein each of the grooves is configured to independently form the respective plurality of continuous wrinkles.

4. A method for producing a roll of stretch film comprising the steps of:
   stretching a stretch film web by passing the stretch film web through a plurality of drums rotating with different surface speeds;
   forming wrinkles in the stretch film web by passing the stretch film web over a first roller positioned downstream of the plurality of drums, the first roller having a grooved surface comprising a plurality of grooves with each groove being configured to form a plurality of continuous wrinkles in the stretch film web between edges of the groove, the wrinkles being oriented generally longitudinally with respect to the stretch film web; and
   winding the stretch film web in a wrinkled state around a second roller so as to trap air within the rolled film.

5. A method according to claim 4, wherein the wrinkles are distributed generally evenly across the width of the stretch film web.

6. A method according to claim 4, wherein each of the grooves is configured to independently form the respective plurality of continuous wrinkles.

7. An apparatus for rolling a stretch film web comprising:
   a plurality of drums for stretching the stretch film web, the drums being configured to rotate with different surface speeds to stretch the web;
   a grooved surface for engaging the stretch film web downstream of the plurality of drums, the grooved surface comprising a plurality of grooves with each groove being configured to form a plurality of continuous wrinkles in the stretch film web between edges of the groove, the wrinkles being oriented generally longitudinally with respect to the stretch film web;
   a roller for winding the wrinkled stretch film so as to trap air in the rolled film; and
   an assembly for rotatably driving the roller.

8. An apparatus according to claim 7, wherein each of the grooves is parallel to the machine direction of the stretch film web.

9. An apparatus according to claim 7, wherein each of the grooves is configured to independently form the respective plurality of continuous wrinkles.

10. A method for producing a roll of stretch film comprising the steps of:
    stretching a stretch film web by passing the stretch film web through a plurality of drums rotating with different surface speeds;
    forming wrinkles in the stretch film web by passing the stretch film web over a grooved surface positioned downstream of the plurality of drums, the grooved surface comprising a plurality of grooves with each groove being configured to form a plurality of continuous wrinkles in the stretch film web between edges of the groove, the wrinkles being oriented generally longitudinally with respect to the stretch film web; and
    winding the stretch film web in a wrinkled state around a roller so as to trap air within the roll of stretch film.

11. A method according to claim 10, wherein each of the grooves is parallel to the machine direction of the stretch film web.

12. A method according to claim 10, wherein each of the grooves is configured to independently form the respective plurality of continuous wrinkles.

13. A roll of stretch film, the stretch film being rolled in a wrinkled state so as to trap air within the roll, the wrinkled stretch film comprising wrinkles formed therein, the wrinkles being oriented generally longitudinally with respect to the stretch film web, the wrinkles being formed by a grooved surface of a roller downstream of a plurality of drums that rotate with different surface speeds to stretch the web, the grooved surface comprising a plurality of grooves with each groove being configured to form a plurality of continuous wrinkles in the stretch film web between edges of the groove.

14. A roll of stretch film according to claim 13, wherein each of the grooves is configured to independently form the respective plurality of continuous wrinkles.

15. A roll of stretch film, the stretch film being wound against a grooved surface downstream of a plurality of drums that rotate with different speeds to stretch the stretch film web, the grooved surface comprising a plurality of grooves with each groove being configured to form a plurality of continuous wrinkles in the stretch film between edges of the groove, the wrinkles being oriented generally longitudinally with respect to the stretch film web, each wrinkle enabling the introduction of air into the roll of stretch film.

16. A roll of stretch film according to claim 15, wherein the grooved surface is a roller surface.

17. A roll of stretch film according to claim 15, wherein each of the grooves is configured to independently form the respective plurality of continuous wrinkles.

18. An apparatus for rolling a stretch film web comprising:
a plurality of drums for stretching the stretch film web, the drums being configured to rotate with different surface speeds to stretch the web;
a first roller positioned downstream from the plurality of drums, the first roller having a grooved surface for engaging the stretch film web;
a second roller for winding the stretch film web against the first roller, the grooved surface of the first roller comprising a plurality of grooves with each groove being configured to form a plurality of continuous wrinkles in the stretch film web between edges of the groove, the wrinkles being oriented generally longitudinally with respect to the stretch film web, each wrinkle enabling the introduction of air into the wound stretch film web; and
an assembly for rotatably driving the second roller.

19. An apparatus according to claim 18, wherein each of the grooves is configured to independently form the respective plurality of continuous wrinkles.

20. A method for producing a roll of stretch film comprising the steps of:
stretching a stretch film web by passing the stretch film web through a plurality of drums rotating with different surface speeds;
forming wrinkles in the stretch film web by passing the stretch film web over a first roller positioned downstream of the plurality of drums; and
winding the stretch film web around a second roller against the first roller, the first roller having a grooved surface comprising a plurality of grooves with each groove being configured to form a plurality of continuous wrinkles in the stretch film web between edges of the groove, the wrinkles being oriented generally longitudinally with respect to the stretch film web, each wrinkle enabling the introduction of air into the wound stretch film web.

21. A method according to claim 20, wherein the wrinkles are formed by the grooved surface.

22. A method according to claim 20, wherein each of the grooves is configured to independently form the respective plurality of continuous wrinkles.

23. An apparatus for rolling a stretch film web comprising:
a plurality of drums for stretching the stretch film web, the drums being configured to rotate with different surface speeds to stretch the web;
a grooved surface for engaging the stretch film web downstream of the plurality of drums;
a roller for winding the stretch film web against the grooved surface, the grooved surface comprising a plurality of grooves with each groove being configured to form a plurality of continuous wrinkles in the stretch film web between edges of the groove, the wrinkles being oriented generally longitudinally with respect to the stretch film web, each wrinkle enabling the introduction of air into the wound stretch film web; and
an assembly for rotatably driving the roller.

24. An apparatus according to claim 23, wherein each of the grooves is parallel to the machine direction of the stretch film web.

25. An apparatus according to claim 23, wherein each of the grooves is configured to independently form the respective plurality of continuous wrinkles.

26. A method for producing a roll of stretch film comprising the steps of:
stretching a stretch film web by passing the stretch film web through a plurality of drums rotating with different surface speeds;
forming wrinkles in the stretch film web by passing the stretch film web over a grooved surface positioned downstream of the plurality of drums; and
winding the stretch film web around a roller against the grooved surface, the grooved surface comprising a plurality of grooves with each groove being configured to form a plurality of continuous wrinkles in the stretch film between edges of the groove, the wrinkles being oriented generally longitudinally with respect to the stretch film web, each wrinkle enabling the introduction of air into the wound stretch film web.

27. A method according to claim 26, wherein each of the grooves is parallel to the machine direction of the stretch film web.

28. A method according to claim 26, wherein the wrinkles are formed by the grooved surface.

29. A method according to claim 26, wherein each of the grooves is configured to independently form the respective plurality of continuous wrinkles.

* * * * *